United States Patent Office 3,723,387
Patented Mar. 27, 1973

3,723,387
PREPARATION OF CURABLE AND CURED
FLUOROPOLYMER PRODUCTS
Jack Leland Nyce, Newark, Del., assignor to E. I. du
Pont de Nemours and Company, Wilmington, Del.
No Drawing. Filed May 12, 1971, Ser. No. 142,793
Int. Cl. C08f 15/40, 29/16
U.S. Cl. 260—47 UP                                13 Claims

ABSTRACT OF THE DISCLOSURE

A curable fluoropolymer which will undergo cross-linking when heated in the presence of a cross-linking agent (e.g. resorcinol) and an acid catalyst (e.g. isopropyltosylate) can be made from a copolymer-forming reaction mixture containing vinylidene fluoride, at least one other fluorinated ethylenically unsaturated monomer containing at least as many fluorine atoms as carbon atoms, and a small amount of allylidene diacetate or acrolein dimethylacetal. The resulting vinylidene fluoride copolymer can be used to make cured or cross-linked fluoropolymer products having beneficial utility in applications where resistance to degradation by steam is required.

BACKGROUND OF THE INVENTION

This invention relates to a process for preparing a curable vinylidene fluoride copolymer; it also relates to the resulting copolymer and its use in the manufacture of cured or cross-linked fluoropolymer products.

The term "copolymer" as used herein means the product of copolymerizing two or more different monomers.

It is known in the art that there is a need for cured vinylidene fluoride copolymer products having improved resistance to degradation by steam. There is a particular need for cured elastomeric vinylidene fluoride copolymer products which will not undergo any undue increase in hardness or modulus (resistance to stretching), when exposed to steam.

SUMMARY OF THE INVENTION

The present invention provides a process for preparing a fluoropolymer which comprises (A) providing a reaction mixture containing as monomer components
(A-1) about 30-95 mol percent of vinylidene fluoride,
(A-2) about 5-70 mol percent of at least one other fluorinated ethylenically unsaturated monomer containing at least as many fluorine atoms as carbon atoms, and
(A-3) about 0.25-5.0 mol percent of a monomer selected from the group: allylidene diacetate and acrolein dimethylacetal, said mol percent values being based on the total mols of the monomer components, and
(B) subjecting said mixture to free-radical polymerization conditions until a copolymer of the monomer components is formed.

The invention also provides a vinylidene fluoride copolymer in which each 100 mols of polymerized units contain about 30-95 mols of units from vinylidene fluoride, about 5-70 mols of units from at least one other fluorinated ethylenically unsaturated monomer containing at least as many fluorine atoms as carbon atoms, and about 0.25-5.0 mols of units of the formula

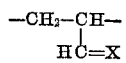

wherein X is selected from the group: O, (OCH$_3$)$_2$ and (OCOCH$_3$)$_2$.

In addition, there is provided a process for preparing a cross-linked fluoropolymer which comprises (1) providing a mixture of (a) a copolymer as defined in the previous paragraph, (b) a compound able to function as a cross-linking agent for the copolymer, and (c) an acid catalyst able to accelerate the cross-linking reaction, and
(2) heating the resulting mixture until the copolymer has undergone the desired amount of cross-linking.

Also, the invention includes a cross-linked fluoropolymer obtained by the process defined in the previous paragraph.

DESCRIPTION OF PREFERRED EMBODIMENTS

In preparing a curable fluoropolymer according to the present invention, it is often preferred that the reaction mixture of step (A) also contains water and a free-radical initiator, and step (B) is carried out as a free radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example sodium, potassium, and ammonium perphosphates, perborates, and percarbonates. The initiator can be used in combination with a reducing agent such as sodium, potassium, or ammonium sulfite, bisulfite, metabisulfite, hydrosulfite, thiosulfite, phosphite, or hydrophosphite, or in combination with a ferrous, cuprous, or silver salt, or other easily oxidized metal compound. Known organic free-radical initiators can also be used, preferably in combination with a suitable surfactant such as a fluorocarbon surfactant (e.g. ammonium perfluorooctanoate).

The reaction mixture can also contain a chain transfer agent, which may be defined as a material capable in any given polymerization system of the present invention of transferring the radical activity from a growing polymer molecule to a molecule of the transfer agent, whereby growth of another polymer molecule is initiated and the polymerization reaction continues. Chain transfer agents which can be used to obtain non-ionic end groups in the copolymer product include hydrocarbon alcohols, esters, halides, ketones, and mercaptans containing 1-12 carbon atoms. Among the most useful transfer agents are diethylmalonate, diethylsuccinate, ethylacetate, methylene bromide, carbontetrachloride, ethanol, n-propanol, and isopropanol, and blends of two or more such compounds. Examples of other useful compounds are acetone, dodecylmercaptan, methanol, methylacetate, butylacetate, ethylpropionate, cyclohexanone, methylenechloride, and the like. The various chain transfer agents differ as to their efficiency in performing the chain transfer function in a given polymerization system.

The step (B) polymerization can be carried out in aqueous dispersion, in bulk, or in an organic liquid containing an organic free-radical initiator.

During step (B), the reaction mixture is preferably heated at about 50–130° C. under superatmospheric pressure, for example under a pressure of about 100–2000 p.s.i.g., preferably about 500–1500 p.s.i.g. In some of the most useful embodiments of the process, the polymerization is carried out as a continuous process and the reaction mixture has an average residence time in the reactor of about 5–60 minutes.

Regarding the mol percent values for the monomers used in the reaction mixture, when using about the 70 mol percent maximum of (A-2), one could deduct the mol percent of (A-3) to be used from either the 70% of A-2 or the 30% of A-1 to make a total of 100 mol percent, as one skilled in the art would realize from the "about" values given; the same applies to "about" 95 mol percent of monomer A-1.

It is often preferred that the monomer component (A-1) (vinylidene fluoride) and monomer component (A-2) specified in step (A) have a molar ratio of about 70:30 to 85:15. Especially preferred as component (A-2) is hexafluoropropylene. Another preferred monomer mixture to use in step (A) employs as component (A-2) a blend of hexafluoropropylene and tetrafluoroethylene in an amount such that each 100 mols of the (A-1/A-2) mixture contains about 30-80 mols of vinylidene fluoride, 15-40 mols of hexafluoropropylene, and 5-30 mols of tetrafluoroethylene. Another very useful monomer mixture contains about 30-80 mol percent of vinylidene fluoride, about 15-40 mol percent of a perfluoroalkyl perfluorovinyl ether having the formula

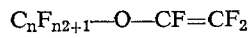

$$C_nF_{2n+1}-O-CF=CF_2$$

wherein $n$ is a number of 1–5, and about 5–30 mol percent of tetrafluoroethylene, based on the total mols of components A-1 and A-2. The resulting copolymer can be cured successfully by the curing process of this invention; and this is a worthwhile advance in the art since prior art copolymers made from such A-1/A-2 monomers, especially when the vinylidene fluoride content is relatively low (e.g. about 30–40 mol percent), tend to be difficult or impossible to cure by known methods. The above monomers are fed to a polymerization reaction zone in a ratio that is the same or similar to the ratio of these monomer units desired in the copolymer product.

Among the other monomers which can be used as component (A-2) of the reaction mixture are chlorotrifluoroethylene, dichlorodifluoroethylene, trifluoropropene, hexafluorobutene, fluorinated vinyl esters, derivatives of perfluoro acrylic acid, 1,2,3,3,3-pentafluoropropylene and the like.

It is preferred in many application of the process that the component (A-3) monomer content of the reaction mixture is about 0.75–1.0 mol percent based on the total mols of monomer components. The use of component (A-3) leads to the formation of

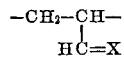

units in the polymer, and these units provide cure sites which enable one to cure the polymer without adding the basic ingredients commonly used in curing vinylidene fluoride copolymers (e.g. basic ingredients such as magnesium oxide, magnesium hydroxide, and/or amine compounds). Too little of this component tends to result in a slow-curing polymer and/or porosity in the cured product; and too much of this component tends to render the cured product less resistant to damage during extended exposure to elevated temperatures.

After completion of the preferred emulsion polymerization reaction, the fluoropolymer can be isolated from the resulting polymer latex by known methods, for example by coagulation by adding an electrolyte or by freezing, followed by centrifuging or filtering and then drying the polymer.

It is a preferred embodiment of the novel polymer-manufacturing process to carry out step (B) so that the copolymer obtained in step (B) contains

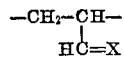

units wherein X is $(OCOCH_3)_2$ as shown in the above description of the novel polymer. This can be accomplished by using allylidene diacetate as monomer A-3 and having the reaction mixture at a relatively high pH for a vinylidene fluoride copolymer manufacturing process, for example at a pH of about 6–7. One skilled in the art will be able to select a suitable pH of the reaction mixture for a particular set of components and reaction conditions so that the units obtained have the resulting blocked aldehyde groups. If one is conducting the process under a predetermined set of conditions which provide the blocked aldehyde groups, and then one decides he wishes to prepare a copolymer in which each of said units contains an aldehyde group instead (X=oxygen), one can lower the pH of the reaction mixture until this change is accomplished. Or one can hydrolyze the blocked aldehyde groups to form aldehyde groups after completing step (B), for example by adding a strong mineral acid until the pH of the mixture is suitably reduced (e.g. to a pH of about 2–4).

If one wishes to prepare the copolymer in which said units contain methyl acetal groups $[X=(OCH_3)_2]$, this is accomplished by using acrolein dimethylacetal as monomer A-3, and using a reaction mixture pH of about 6–7. Here again, if one wishes X to be oxygen, the procedures described in the previous paragraph can be used (reducing the pH of the reaction mixture or subsequently adding an acid until hydrolysis occurs).

As indicated above, one can prepare cured or cross-linked polymer products by mixing the novel copolymer with a suitable cross-linking agent and an acid catalyst, and heating the mixture until it is cured. One useful cross-linking agent is urea. A preferred cross-linking agent is resorcinol, which is preferably added in an amount equal to about 0.7–1.0% by weight of the copolymer. Also useful are other phenolic compounds (aromatic compounds having one or more hydroxyl groups), including mono-, di-, tri-, and tetrahydroxybenzenes, naphthalenes, and anthracenes, and bisphenols of the formula

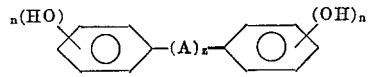

wherein A is a difunctional aliphatic, cycloaliphatic, or radical of 1–13 carbon atoms, or a thio, oxy, carbonyl, sulfinyl, or sulfonyl radical; A is optionally substituted with at least one chlorine or fluorine atom; $x$ is 0 or 1; $n$ is 1 or 2; and any aromatic ring of the hydroxylic compound is optionally substituted with at least one atom of chlorine, fluorine, or bromine, or a carboxyl or acyl radical.

In combination with the cross-linking agent, one uses an acid catalyst which is able to accelerate the cross-linking reaction. The "acid catalyst" is either a preformed acid compound or an acid-generating compound that forms an acid in situ under the curing conditions employed. A preferred acid catalyst is isopropyltosylate, which is preferably added in an amount equal to about 1–2% by weight of the copolymer. Also useful are other acid compounds known to be able to accelerate or facilitate aldehyde condensation reactions, for example paratoluene sulfonic acid, polyphosphoric acid, stannous chloride, benzylic halides and sulfates, strong acid ion exchange resins such as sulfonated polystyrene and sulfonated coal, bromomethylated aromatic resins and the like. The cross-linking agent and catalyst can be mixed with the copolymer by means of any mixing apparatus known to be useful for preparing rubber compositions, for example a roller-type rubber mill or a Banbury mixer. Known fillers, pigments, pore-forming agents, and other additives can also be blended with the composition. The composition can also be mixed with a solvent for the copolymer to form a liquid composition useful in the preparation of adhesive layers, coatings, films, and the like. Among the preferred solvents are acetone, methylethyl ketone, ethyl acetate, amyl acetate, and tetrahydrofuran.

The initial curing of the curable composition is preferably carried out by heating the composition for about 1–60 minutes at about 149–204° C.; conventional rubber-curing presses, molds, extruders, and the like provided with suitable heating and curing means can be used. Also, if one wants a product having maximum heat resistance and dimensional stability, it is preferred to carry out a post-curing operation wherein the article is heated in an oven or the like for an additional period of about 1–48 hours at about 180–300° C. One skilled in the art will realize that the best curing time and temperature for a particular application will depend on such factors as the nature and proportion of ingredients and the properties needed in the final product.

The polymer manufacturing process of this invention has beneficial utility for the manufacture of vinylidene fluoride copolymers. Such copolymers are obtainable by this process which not only have utility in the manufacture of cured elastomer articles having useful compression set properties for many applications, but also have the ability to retain such properties as desirable hardness, modulus, and elongation values when the cured articles are subjected to prolonged or repeated exposure to steam. Much better steam resistance can be obtained in polymers made and cured according to the present invention than is possible in most of the prior art vinylidene fluoride copolymers, such as those which employ such basic materials in the curing process as magnesium oxide, magnesium hydroxide, and/or amine compounds. Fluoroelastomers can easily be made by the present process in grades suitable for compounding and curing by practical methods to yield highly useful cured elastomer articles for applications such as films, gaskets, O-rings, and the like which are resistant to damage by moisture and corrosive chemicals at high temperatures.

Example 1

This example and those that follow illustrate the invention; all amounts are by weight unless otherwise indicated.

A novel curable fluoroelastomer of this invention is prepared by a continuous process composed of the following operations:

(1) Continuously feeding monomers to a 2-liter stainless steel pressure vessel reactor (polymerization reaction zone), while operating the stirrer of the reactor at 700 r.p.m. for thorough mixing of the reactor contents and while the contents of the reactor are heated at 100° C. under a presure of 900 p.s.i.g. so that the reaction mixture formed in operation (2) below will undergo an emulsion polymerization reaction as it passes through the reactor, the nominal reactor residence time being about ½ hour based on the 1:2 ratio of the 2-liter reactor to the water feed rate of 4 liters per hour, the monomers being vinylidene fluoride (feed rate of 9.5 mols per hour), hexafluoropropylene (feed rate of 3.05 mols per hour), and allylidene diacetate (feed rate of 0.095 mol per hour);

(2) During operation (1), feeding an aqueous solution of initiator and buffer to the reactor through a metering pump at the rate of 4 liters per hour, the solution containing ammonium persulfate as initiator and $K_2HPO_4$ as buffer in an amount such that the initiator is fed at the rate of 0.023 mol per hour, dry basis, and the buffer is fed at the rate of 0.1 mol per hour, thereby maintaining the reaction mixture at a pH of about 6;

(3) Continuously removing from the reactor the resulting copolymer latex which is continuously formed during operation (1) and (2), the latex being passed through a back-pressure regulating valve set to maintain the desired reactor pressure of 900 p.s.i.g.;

(4) After discarding the latex obtained during the first four residence times, collecting the desired quantity of latex, and mixing it for uniformity; and (5) Isolating the resulting copolymer from the latex by placing the latex in a freezing zone until it is frozen, allowing the frozen latex to thaw, subjecting the resulting coagulated material to high shear conditions in a blender to break it up into small particles, washing the polymer particles with distilled water, and removing the water by means of a filter apparatus and then in a blower-equipped oven at 70° C.

The resulting vinylidene fluoride copolymer is an elastomer which can be cured in the manner described below in Example 2; it contains in each 100 mols of polymerized units about 79.25 mols of polymerized vinylidene fluoride, 20 mols of polymerized hexafluoropropylene and 0.75 mol of cure-site units of the formula

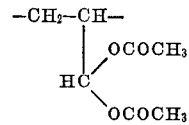

The presence of these units is shown by the presence of carbonyl absorption at 5.66 microns in the infrared spectrum of a pressed film of the polymer. The copolymer has an inherent viscosity of 1.03; this property is measured at 30° C. at a polymer concentration of 0.1% by weight in a solvent composed of 87% by weight of tetrahydrofuran and 13% by weight dimethylformamide. The copolymer is useful in the manufacture of O-rings and other cured elastomer articles (by the curing process of this invention) having useful stress/strain and compression set properties and superior resistance to damage by exposure to steam.

EXAMPLE 2

Another curable fluoroelastomer of this invention is prepared by repeating Example 1 except in step 5 the copolymer is isolated by an acid coagulation procedure wherein concentrated hydrochloric acid is gradually added to the latex with stirring at 25° C. until the polymer is coagulated; the resulting coagulated polymer particles are washed with distilled water; and the water is removed by first using a filter apparatus and then using a blower-equipped oven at 70° C. In more than 50% of the cure-site units of the resulting copolymer, X has been converted from $(OCOCH_3)_2$ to oxygen (O); this is shown by a change in the carbonyl absorption from 5.66 microns to 5.75 microns in the infrared spectrum of a pressed film of the copolymer.

Cured fluoroelastomer test samples for the tests described below are prepared according to the novel curing process by (a) mixing the following ingredients on a 2-roll rubber mill whose rolls are at about 25° C.: 100 parts of the vinylidene fluoride copolymer described above. 30 parts of carbon black (Thermax MT), 0.75 part of resorcinol, and 1.0 part of isopropyltosylate; (b) heating the resulting mixture in a mold at 160° C. under a total pressure of 30,000 pounds for 30 minutes; and (c) postcuring the samples in an oven in which a blower circulates the air while the temperature rises to 204° C. during a period of 4 hours and then remains at 204° C. for 24 hours.

Results of testing the cured samples of Example 2 can be seen below in Table I. The modulus, tensile, and elongation values are obtained at room temperature by ASTM Method D-412-66. Compression set test values are obtained by ASTM D-395-61 Method B, using as test samples molded pellets having a thickness of 0.5 inch and a diameter of 0.75 inch, and conducting the test at 204° C. for 70 hours. Shore hardness (Durometer A) is tested by ASTM Method D-676. The steam-aged samples are prepared by storing the as-cured samples for 7 days in a pressure vessel filled with saturated steam at 100 p.s.i. (164° C.).

TABLE I

| Example | 2 | 2A |
|---|---|---|
| As-cured samples: | | |
| Modulus—100%, p.s.i | 625 | 825 |
| Tensile strength, p.s.i | 1,360 | 1,640 |
| Elongation at break, percent | 145 | 165 |
| Shore hardness | 69 | 71 |
| Compression set | 52 | 60 |
| Steam-aged samples: | | |
| Modulus—100%, p.s.i | 425 | 1,450 |
| Tensile strength, p.s.i | 1,285 | 1,675 |
| Elongation at break, percent | 160 | 125 |
| Shore hardness | 62 | 80 |

It can be seen that the Example 2 samples, on exposure to steam for 7 days, undergo some decrease in hardness and modulus (stretch resistance), which is desirable in many applications. The product still has very useful modulus, tensile, elongation, and hardness values after 7 days in the steam test; in fact, it still does after 21 days in the steam test (modulus=525, tensile=1040, elongation=135, hardness=62). O-rings and the like are still useful after 21 days in the steam test.

EXAMPLE 2A

A typical prior art curable fluoroelastomer is prepared for purposes of comparison in the manner described in Example 1 except in step 1 the vinylidene fluoride feed rate is 9.6 mols per hour, the hexofluoropropylene feed rate is 2.4 mols per hour, and the allylidene diacetate is omitted. And in step 5 the copolymer is isolated in the manner described in Example 2.

The resulting copolymer elastomer contains in each 100 mols of polymerized units about 80 mols of polymerized vinylidene fluoride and 20 mols of polymerized hexafluoropropylene; and, of course, it contains no allylidene diacetate-derived cure-site units as did the products of Examples 1 and 2. Its inherent viscosity is about 0.9.

Cured fluoroelastomer test samples for use in the tests described in Example 2 are prepared by mixing the following ingredients on a 2-roll rubber mill whose rolls are at about 25° C.: 100 parts of the vinylidene fluoride copolymer just described, 30 parts of Thermax MT carbon black, 10 parts of magnesium oxide, and 1.5 parts of hexamethylene diamine carbamate; and then repeating steps (b) and (c) of Example 2.

Results of testing the resulting samples in the manner described in Example 2 can be seen above in Table I. It will be noted that the Example 2A samples, after 7 days in the steam test, undergo an increase in hardness from 71 to 80 (about 13%) and an increase in modulus from 852 to 1450 (about 76%). This is very undesirable in many applications; in fact, O-rings and the like made from this product are so hard and brittle as to have little or no utility in most applications after the 7-day steam test.

Example 3

A curable fluoroelastomer is prepared in the manner described in Example 1 except in step 1 the monomers are: vinylidene fluoride (feed rate of 7.58 mols per hour), hexafluoropropylene (feed rate of 2.39 mols per hour), tetrafluoroethylene (feed rate of 2.21 mols per hour), and allylidene diacetate (feed rate of 0.085 mol per hour).

The resulting vinylidene fluoride copolymer is an elastomer which can be cured in the manner described in Example 2. It contains in each 100 mols of polymerized units about 56.2 mols of units from vinylidene fluoride, 18.3 mols of units from hexafluoropropylene, 24.8 mols of units from tetrafluoroethylene, and 0.70 mol of allylidene diacetate-derived cure-site units of the formula shown in Example 1. This elastomer has an inherent viscosity of 1.1; and it is useful in the manufacture of cured O-rings and the like having useful stress/strain and compression set properties plus good resistance to damage by exposure to steam.

Example 4

Another curable fluoroelastomer of the present invention is prepared in the manner described in Example 1 except in step 1 the monomers are: vinylidene fluoride (feed rate of 9.1 mols per hour), perfluoromethyl perfluorovinyl ether (feed rate of 1.8 mols per hour), tetrafluoroethylene (feed rate of 1.2 mols per hour), and allylidene diacetate (feed rate of 0.12 mol per hour). And in step 2, the $K_2HPO_4$ is replaced with $Na_2HPO_4$. The resulting vinylidene fluoride copolymer is an elastomer which can be cured in the manner described in Example 2 in the manufacture of O-rings and the like having useful stress/strain and compression set properties plus good resistance to damage by exposure to steam. This elastomer has an inherent viscosity of 1.02; and it contains in each 100 mols of polymerized units about 76.4 mols of units from vinylidene fluoride, 13.7 mols of units from perfluoromethyl perfluorovinyl ether, 8.9 mols of units from tetrafluoroethylene, and 1 mol of allylidene diacetate-derived cure-site units of the formula shown in Example 1.

I claim:

1. A process for preparing a fluoropolymer which comprises
   (A) providing a reaction mixture containing as monomer components
      (A-1) about 30–95 mol percent of vinylidene fluoride,
      (A-2) about 5–70 mol percent of at least one other fluorinated monoethylenically unsaturated monomer containing at least as many florine atoms as carbon atoms, and
      (A-3) about 0.25–5.0 mol percent of a monomer selected from the group: allylidene diacetate and acrolein dimethylacetal, said mol percent values being based on the total mols of the monomer components, and
   (B) subjecting said mixture to free-radical polymerization conditions until a copolymer of the monomer components is formed.

2. A process according to claim 1 wherein the reaction mixture of step (A) also contains water and a free-radical initiator, and step (B) is carried out as a free-radical emulsion polymerization reaction.

3. A process according to claim 2 wherein the reaction mixture is heated during step (B) at about 50–130° C. under superatmospheric pressure.

4. A process according to claim 2 wherein monomer component (A-2) is hexafluoropropylene.

5. A process according to claim 2 wherein the reaction mixture contains about 30–80 mol percent of vinylidene fluoride, about 15–40 mol percent of hexafluoropropylene, and about 5–30 mol percent of tetrafluoroethylene, based on the total mols of components A-1 and A-2.

6. A process according to claim 2 wherein the reaction mixture contains about 30–80 mol percent of vinylidene fluoride, about 15–40 mol percent of a perfluoroalkyl perfluorovinyl ether having the formula $C_nF_{2n+1}$—O—CF=CF$_2$ wherein $n$ is a number of 1–5, and about 5–30 mol percent of tetrafluoroethylene, based on the total mols of components A-1 and A-2.

7. A process according to claim 2 wherein the component (A-3) content of the reaction mixture is about 0.75–1.0 mol percent.

8. A process according to claim 2 wherein the resulting fluoropolymer is isolated from the polymer latex obtained in step (B).

9. A vinylidene fluoride copolymer which is a normally solid addition polymer in which each 100 mols of polymerized units contain about 30–95 mols of units from vinylidene fluoride, about 5–70 mols of units from at least one other fluorinated monoethylenically unsaturated monomer containing at least as many fluorine atoms as carbon atoms, and about 0.25–5.0 mols of units of the formula

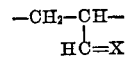

wherein X is selected from the group: O, (OCH$_3$)$_2$ and (OCOCH$_3$)$_2$.

10. A cross-linked fluoropolymer obtained by a process which comprises
   (1) providing a mixture of (a) a copolymer as defined in claim 9, (b) a compound able to function as a cross-linking agent for the copolymer and selected from the group; phenolic compounds and urea, and
   (c) an acid catalyst able to accelerate the cross-linking reaction, and (2) heating the resulting mixture until the copolymer has undergone the desired amount of cross-linking.

11. A product according to claim 10 wherein component (b) is resorcinol, and the amount used is equal to about 0.7–1.0 percent by weight of the copolymer.

12. A product according to claim 10 wherein component (c) is isopropyl tosylate, and the amount used is equal to about 1–2% by weight of the copolymer.

13. As a novel composition useful for preparing a cross-linked fluoropolymer, a mixture of components (a), (b) and (c) as defined in claim 10.

References Cited

UNITED STATES PATENTS 3,235,537    2/1966    Albin et al. _____ 260—80.5

JAMES A. SEIDLECK, Primary Examiner

S. M. LEVIN, Assistant Examiner

U.S. Cl. X.R.

260—41 C, 80.76, 80.77, 87.7